Oct. 12, 1948.  W. G. H. FINCH  2,451,078
DIRECTIONAL ANTENNA TUNING SYSTEM
Filed Sept. 7, 1944  2 Sheets-Sheet 1
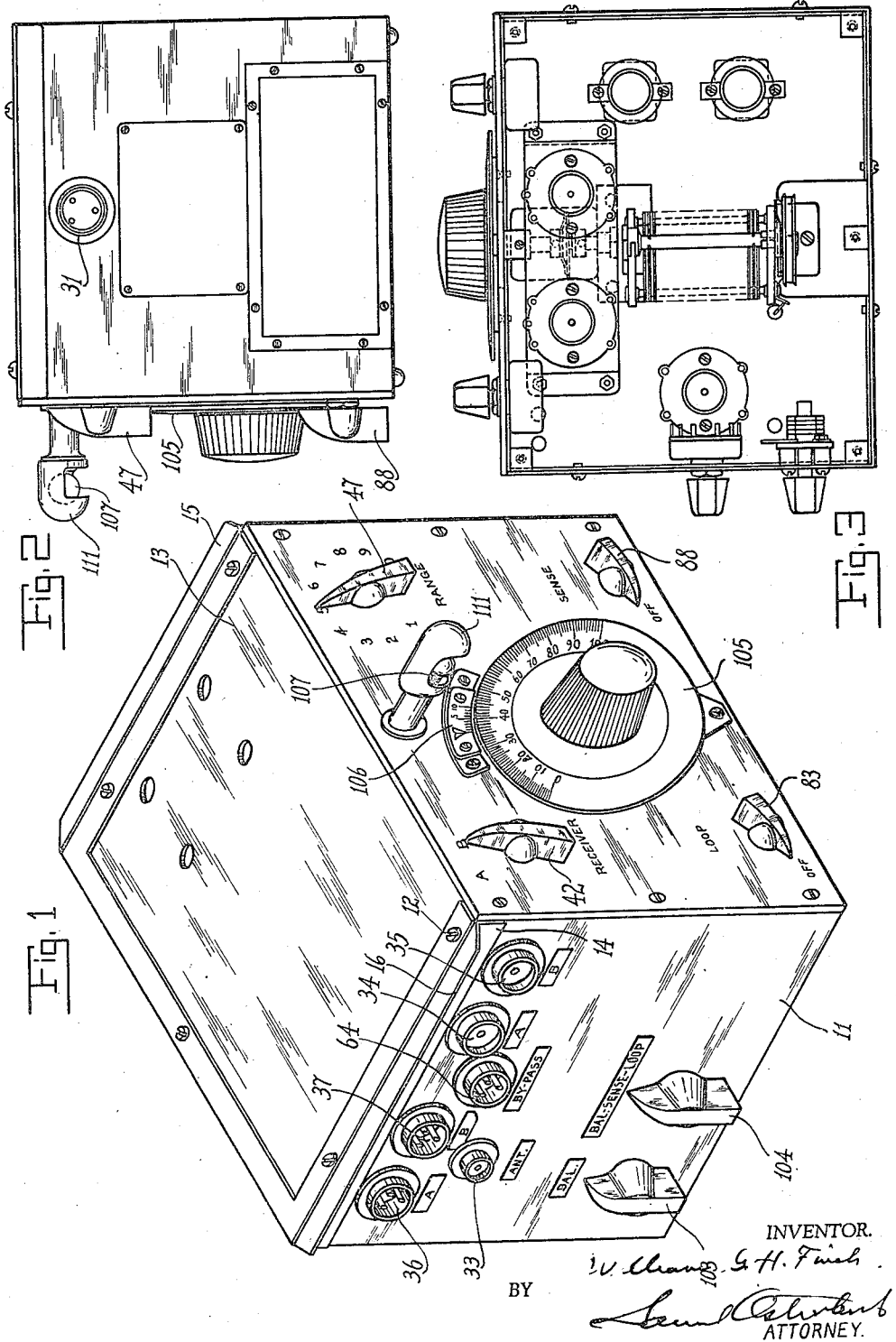
INVENTOR.
W. Chang, G. H. Finch
BY
ATTORNEY.

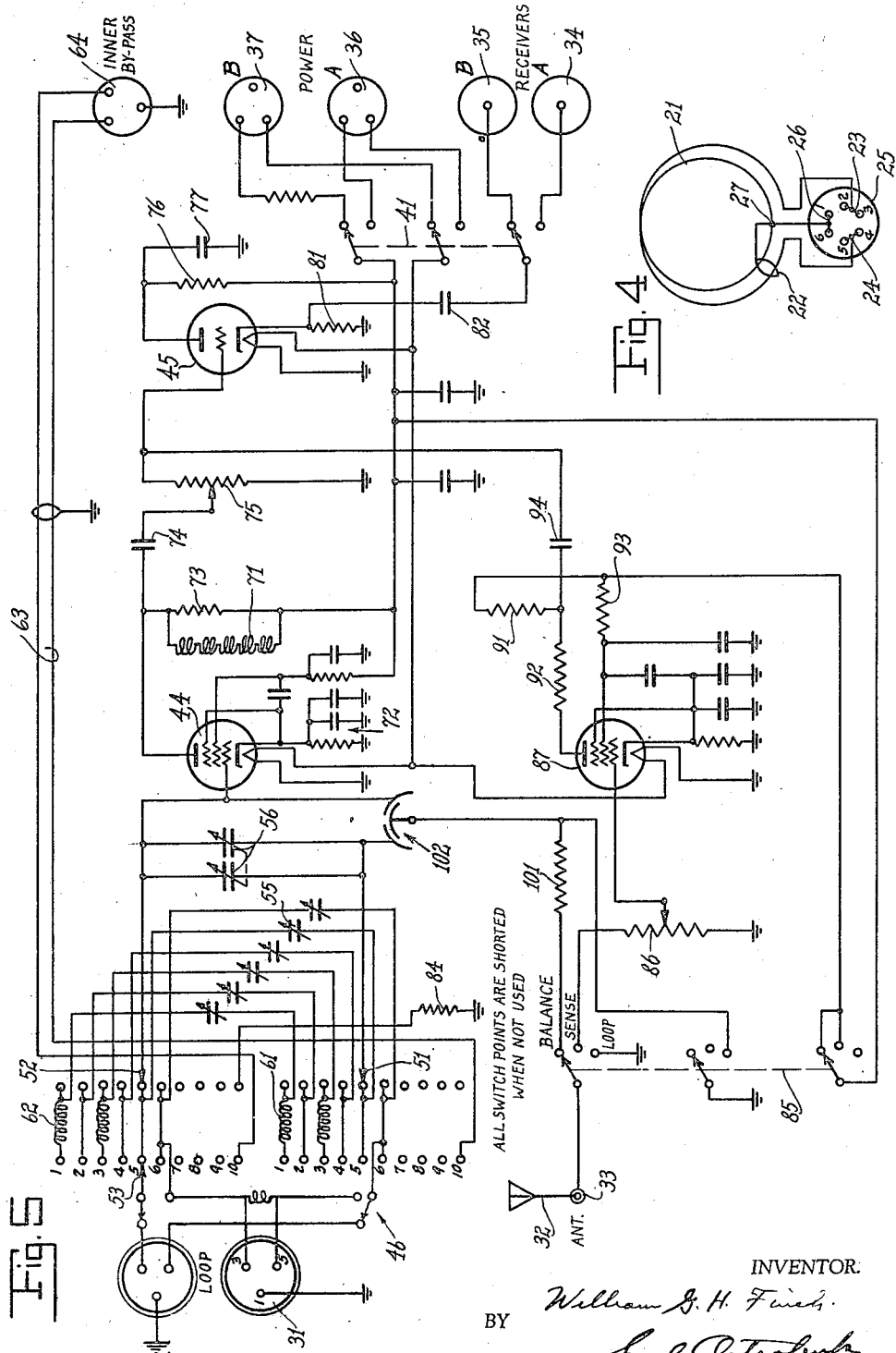

Patented Oct. 12, 1948

2,451,078

UNITED STATES PATENT OFFICE 2,451,078

DIRECTIONAL ANTENNA TUNING SYSTEM

William G. H. Finch, Newtown, Conn.

Application September 7, 1944, Serial No. 552,957

5 Claims. (Cl. 343—113)

My invention relates in general to radio direction finding apparatus and more particularly concerns a novel unit for tuning a directional antenna and coupling the received signals to a radio receiver.

Generally, as is well known in radio direction finding, a loop antenna is tuned to the signal generated by the station of which the location is desired. A radio receiver is used to demodulate and amplify the received signals and impress the demodulated energy upon a sound reproducer or upon an amplitude indicator Rotation of the loop will cause a corresponding variation in the intensity of the demodulated energy and as is well known when a null signal is obtained, then the plane of the loop antenna is normal to the bearing of the station being located.

A non-directional or rod antenna is normally employed in conjunction with a loop antenna in order that the sense of the bearing may be determined. Thus, since the loop antenna, when used alone only indicates the general line along which the station is located, the combination of the loop and rod antenna will indicate both the general bearing and the direction along this bearing.

It is desirable in direction finding practice to utilize the existing commercial radio receiving apparatus for detecting the signals of the station. However, a loop antenna may not normally be joined to the input circuits of a conventional type of radio receiver and furthermore, as mentioned, it is desirable to combine a loop and vertical rod antenna for complete determination of the whereabouts of the unknown station.

My invention therefore contemplates a tuning unit particularly designed to adapt radio receivers of various frequency ranges to radio direction finding loops and sense antennae.

For mobile direction finding equipment, it is often desirable that the tuning range of the equipment be large enough to cover the entire range of frequencies which may possibly be used for the transmission of intelligence. This is particularly advantageous for portable equipment to be used by the Federal Communications Commission in determining the exact whereabouts of an illegally operated or unlicensed station.

For this purpose, or for similar direction finding purposes, several mobile direction finding units are used to simultaneously determine the bearing of a station, each of the mobile units being disposed at a different point. When each of the mobile units determine the bearing, these may be graphically or mathematically analyzed to determine by their intersection the exact position of the station in question.

It is therefore an object of my invention to provide a novel direction finding tuning unit.

It is another object of my invention to provide a coupling unit which may adapt conventional communications receivers for radio direction finding purposes.

A further object of my invention is to provide a compact mobile unit for interconnecting loop and rod antennae with a commercial radio receiver for use in determining the location of radio transmitters.

These and other objects of my invention will now be apparent from the following specification taken in connection with the accompanying drawings, in which:

Figure 1 is a general pictorial view of the various mechanical features of my direction finding tuning unit illustrating the arrangement of the component parts thereof.

Figure 2 is an end view of the tuning unit illustrated in Figure 1

Figure 3 is a bottom view of the tuning unit illustrated in Figure 1, the lower cover thereof being removed to expose the various elements.

Figure 4 is a schematic diagram indicating the connections of a typical loop for use in connection with this direction finding equipment.

Figure 5 is a schematic wiring diagram of the loop tuner for interconnecting loop and rod antennae to conventional radio receivers not illustrated.

Since the principal purpose of radio direction finding equipment of the type herein illustrated is for use in connection with mobile equipment, an essential feature thereof is compactness and shock- and vibration-proof mechanical design. As illustrated in Figure 1, the electrical elements of the tuning unit are housed within a light metallic casing 11 which is completely enclosed.

The interior of the housing 11 is readily accessible by merely removing a plurality of screws 12 to release the upper cover 13 thereof or by removing a plurality of screws to loosen the lower cover thereof. The removal of the lower cover, as indicated in Figure 3, permits access to the various specific circuit elements and in addition permits replacement of tubes and other electrical parts.

The entire unit, if used in an airplane or in an automobile, is preferably mounted by a suspension mounting which precludes excessive shock and facilitates removal.

As illustrated in Figure 1, a pair of parallel metallic angles 14 and 15 are secured to the upper edges of the side walls of the housing 11 and thus provide a pair of flat extensions. A correspondingly spaced pair of U-shaped members may be secured to the upper frame of the vehicle in which this unit is to be employed and the housing 11 may therefore be supported thereupon by merely sliding the flat projections of the angles 14 and 15 into the U-shaped sections.

To reduce the deleterious effect of vibration and sudden shock, the U-shaped channels used to support the housing 11 may be lined with strips of shock absorbing material such as a rubber or the like.

The various mechanical features of this loop tuning device will be referred to in later paragraphs following a description of the electrical circuit thereof.

Referring now to Figure 4, a schematic diagram of a balanced loop antenna is shown. The loop turns 21 are normally enclosed within a shield 22 to reduce the effect of electrical disturbances. The terminals of the loop are as illustrated in Figure 4, joined to terminals 23 and 24 of a connector 25, and the electrostatic shield 22 and the midpoint of the loop 27 are joined to the terminal 26 of the connector 25. As illustrated in Figure 4, a six-point connector is used. However, since only three terminals are required for the balanced loop, the terminals are joined in pairs as indicated.

The loop is mounted upon the outer frame of the vehicle in which it is used and is preferably rotatable so that the exact position of the null may be determined. Therefore, the loop may be mounted upon a rotatable support carrying a calibrated azimuth scale.

A pointer on the loop will thus indicate the exact angular position of the station in question. If the loop is rotatably mounted, three slip rings and associated brushes may be utilized to couple the loop tuner illustrated in Figure 5 to the loop of Figure 4.

The slip rings are coupled through the brushes to a cable which then is joined to a connector 31 indicated in Figures 2 and 5. Terminal 1 of this connector as illustrated in Figure 5 provides the necessary ground connection and terminals 3 and 5 join the outer terminals of the loop to the loop tuning circuits illustrated.

A rod antenna 32 schematically illustrated in Figure 5 may also be disposed upon the outer frame of the vehicle and coupled by means of a suitable cable to the loop tuning unit indicated in Figure 5 through a connector 33 as indicated in Figures 1 and 5.

As will be described, the signals intercepted by the loop 21 and the rod antenna 32 may be impressed selectively or in combination upon either of two radio receivers joined to the connectors 34 and 35. The loop tuning circuit of Figure 5 is energized through either of power connectors 36 and 37 as determined by the position of the three pole, double throw switch 41 which is operable from the outside of the housing by knob 42.

The two positions of knob 42 and thus of switch 41 are used to permit the proper adjustment of the power supply.

The operation of switch 41 also selects one of the two receivers being used. Since, as previously mentioned, it is particularly desirable to utilize the well tested and established commercial radio receivers for direction finding work, it also becomes necessary to utilize a plurality of receivers. This is essential because the design of ultra high frequency receivers differs considerably from lower frequency range units.

The circuit indicated in Figure 5 is adaptable as shown to either of two receivers, connected to the tuner through connectors 34 and 35. However, additional receivers covering other tuning ranges may be added if needed.

The power connections 36 or 37 serve to energize the vacuum tube circuits illustrated in Figure 5 with the high plate potential required and the relatively low filament voltage. The loop 21 illustrated in Figure 4 is coupled to the receiver through the amplifiers 44 and 45 and through the tuning unit 46.

The tuning unit comprises essentially a multi-pole switch operable by knob 47 on the front of the housing 11 which selectively connects the loop to adjustable tuned circuits. When the switch is placed in any one position, the loop is joined in parallel with a condenser which may be tuned to a particular frequency. This arrangement permits the coverage of an extensive band of frequencies which may range from the lowest commercial broadcast frequencies to the ultra high frequency range.

Furthermore, in addition to the multi-switch arrangement illustrated at 46, a plurality of loops may be used to cover the required frequency range. Thus, by combining a particular loop having a given inductance and a particular switch position of the tuning unit 46, and a particular receiver, the novel direction finding tuner may cover the complete band.

As illustrated in Figure 5, the contact terminals 51, 52, 53 and 54 move in unison over the ten-point switch illustrated. The switch is, in addition, arranged so that when the contact terminals are at one particular setting such as 5, as illustrated in Figure 5, the remaining contact terminals are short circuited to preclude interference. This has not been illustrated in order to avoid confusion in the drawings.

When the switch terminals are in position 5 as illustrated, a particular loop joined to connector 31 is connected directly in parallel with tuning condenser 55. This condenser 55 may be of the "trimmer type" in that it is adjustable by means of a screw or the like but remains at a particular capacity after an initial adjustment. The variable condensers 56 are joined in parallel with the switch contacts 51 and 52 and thus are always in circuit when parallel with the loop when switch terminals 1 through 6 are employed.

If, for example, the switching member is moved to position 1, then the loop terminals will be coupled to the parallel combination of variable condenser 56 through the fixed inductances 61 and 62. This, in combination with a particular loop, will cover a desired frequency range.

As is evident from Figure 5, the movement of the switch terminals 51 to 54 over the various terminals 1–6 as illustrated, will correspondingly vary the inductance and capacitance used in the tuned circuit.

This will tune the loop to any desired frequency range which may be used in connection with a receiver joined to either connector 34 or connector 35 to receive a signal transmitted from a station, the location of which is desired.

Also, as may be seen, when the multi-position switch operable by knob 47 is moved to position 10 illustrated in Figure 5, the loop utilized and joined to connector 31 is coupled directly through shielded cable 63 to a connector 64 which, as indicated, completely by-passes the vacuum tube circuits of the tuning unit illustrated in Figure 5.

This switching position is utilized whenever the frequency range is extremely high and a special radio receiving and tuning unit is required.

When the multi-position switch 46 is used in any of the positions 1 through 6, the loop may be tuned accurately by the variable condensers 56. The output of the tuned circuit is impressed upon the control grid of a radio frequency amplifier 44, the plate circuit of which is energized from the high potential source through radio frequency choke 71.

The control grid is negatively biased in the conventional manner by cathode biasing circuit 72. The radio frequency output appearing across load resistor 73 is coupled through condenser 74 and variable resistor 75 to the grid of triode amplifier 45. This amplifier is also energized from the high potential source through plate resistor 76 and a small condenser 77 bypasses the radio frequency currents to ground.

The output of vacuum tube 45 is taken from the high potential side of resistor 81 and coupled through condenser 82 to either of the receivers joined to connectors 34 and 35 as determined by the position of switch 41.

The variable resistor 75 functions as a volume control to vary the level of the received loop signal. This volume control is operated by knob 83 on the front of the housing as illustrated in Figures 1 and 3. As previously mentioned, when the multi-position switch 46 is placed in position 10, the loop is directly coupled to connector 64 and it may be seen that contact 52 will, through resistor 84, ground the input to the tuning amplifiers 44 and 45, and thus effectively remove these circuits.

The sense or rod antenna 32 may be selectively joined to the various circuits illustrated by means of a three pole, three position switch 85. When the switch 85 is in the mid-position, the rod antenna is coupled to one end of variable resistor 86, the other end of which is grounded. The signal impressed upon resistor 86 is then joined to the control grid of vacuum tube amplifier 87, the intensity of which is adjusted by means of the variable tap. The resistor 86 is controllable from the front of the housing by means of knob 88 as illustrated in Figures 1 and 3.

As may be seen from Figure 5, when the switch 85 is in the mid-position, the high potential is coupled to the plate of vacuum tube 87 through resistors 91 and 92 and to the screen grid circuit thereof through resistor 93. The grid of the tube is biased in the conventional manner and the output of the plate circuit is coupled through condenser 94 to the control grid of vacuum tube 45, thus paralleling the output of the loop amplifier 44.

When the switch 85 is moved to the loop position, then the rod antenna 32 is grounded directly, and the high potential is disconnected from the plate circuit of tube 87, and accordingly no energy from the rod antenna is applied to the control circuit of vacuum tube 45.

In the third or balance position, the switch 85 joins the rod antenna 32 through resistor 101 to the variable balance condenser 102. This condenser 102 comprises three sections interconnecting the control grid of tube 44, the loop tuning circuits and the rod antenna. Thus, with the switch 85 in the balance position, an adjustment of variable condenser 102 may be utilized to neutralize any normally existing errors of the loop.

The balance condenser 102 is manually operated by knob 103 and the multi-position switch 85 is operated by knob 104 as indicated in Figure 5. Proper adjustment of the apparatus is obtained by determining a null, and adjusting so that another null is obtained when the loop is rotated 180° from the first position.

The tuning control, namely variable condenser 56, is operated by dial 105 which is calibrated and has a vernier scale 106 associated therewith for accurate determinations of frequency. The front panel of the unit may be illuminated, if desired, by means of a bulb 107 within a perforated shield 111.

In operation, the required loop is inserted into the loop connector and the proper switch position of the multi-position switch 46 is determined for the frequency range to be covered. Also, the receiver to be used to cover the frequency range selected is properly connected by means of the switch 41.

The switch 85 is then operated by means of knob 104 to the central or sense position and the maximum volume is obtained by the use of resistor 86. With these adjustments and with the volume controls of the receiver being used turned to the maximum sensitivity, the signal is tuned in on the receiver by means of a loud speaker or indicator.

The loop volume control 75 is then turned to the maximum signal and the loop is tuned by means of variable condenser 56 so that a maximum output is obtained from the receiver or the maximum reading is obtained upon an amplitude indicator used in conjunction therewith.

During this last mentioned operation, the sense volume control 86 is slowly turned down and finally the switch knob 104 is operated so that switch 85 is turned to the loop position which entirely disconnects the non-directional or rod antenna 32. Thus it may be seen that the signal is first detected by means of the non-directional antenna and then the signal is detected by the loop antenna while the non-directional antenna is disconnected.

To determine the bearing of the signal received, the loop may be rotated until a null is obtained. For maximum sensitivity, it is preferable to maintain as low as possible a radio frequency gain on the receiver being used while still obtaining a usable receiver audio-output.

At this point in the operation of the direction finding apparatus, the balance in condenser 102 may be used if a null is obtained for a relatively large angular displacement of the loop. Under these circumstances, the knob 104 and switch 85 is turned to the balance position and the balancing condenser 102 is adjusted by knob 103 so that a lower and shaper null is obtained while adjusting the loop rotation.

A pointer and an associated azimuth scale, if used in connection with the loop may have the pointer adjusted to indicate the true bearing when the null is obtained.

As previously described, a plurality of bearings if taken simultaneously when the positions of the various direction finding stations are known, may be analyzed to determine the exact location of the station. Since the loop bearings are ambiguous in that the direction of the station may be 180° out of phase, with the direction indicated by the pointer, a sense reading may be taken to establish the exact direction of the station. This sense reading is taken after a bearing is originally obtained by going through the aforementioned stations. The tuning unit illustrated provides convenient means for performing the various operations necessary.

Thus the loop is detuned slightly towards the higher frequency range by means of the dial 105 which controls the variable condenser 56. The switch 85 is then turned to the mid- or sense position by means of knob 104 so that the non-directional antenna 32 is coupled to the amplifier 87 which is energized from the high potential source.

The loop is then turned 90° in either direction which may easily and accurately be accomplished by an azimuth scale and associated pointer.

The signal delivered to the receiver through the tuner from the loop and non-directional antenna are then adjusted so that they are substantially equal. Then their combined value is judged aurally or by means of an amplitude indicator and will be greater or less than either antenna used singly depending upon the location of the transmitter with respect to the loop.

This may be determined in an experimental manner and a pointer on the rotatable loop may be arranged so that it points directly towards the transmitter when the aforementioned operations have been performed.

Thus it may be sen that my novel tuning unit which may be conveniently enclosed within the housing 11 indicated in Figure 1 provides convenient means for adapting a plurality of communications receivers to directional and non-directional antennae for direction finding applications. With the aid of this portable unit, the bearing and the sense of any transmitter may be conveniently determined by performing a few relatively simple operations.

The entire unit may be made extremely compact and easily adapted for mobile purposes. The range of frequencies covered may include all of the normal communication channels with the aid of proper commercial receiving apparatus. Thus as illustrated in Figure 5, three receivers joined to connectors 34, 35 and 64 may be adapted to a plurality of loops to cover the entire frequency range. When an ultra high frequency receiver is used in connection with a corresponding loop, the tuner indicated in Figure 5 is conveniently by-passed by means of a simple operation of switch 46 and the loop is directly connected to the receiver through a connector 64.

Since the various modifications of the direction finding tuning unit illustrated will now be evident to those skilled in the art, I prefer to be bound by the appended claims and not by the specific disclosures hereinabove set forth.

What is claimed is:

1. In radio direction finding apparatus, a plurality of loop antennae and a plurality of radio receivers, each of said loops and said receivers being adapted to receive signals of a different limited frequency range, means for combining said loops and said receivers comprising a tuning unit, said tuning unit comprising a plurality of independently operable tuning elements each adapted to a selected frequency range, and switch means for selecting the tuning element having the frequency range to which the said loop antennae is adjusted; and means for tuning the tuning element and loop within said frequency range for receiving a signal within said selected frequency range means for amplifying said signal and selective means for impressing said signal upon one of said receivers, a non-directional antenna, and means for selectively coupling said non-directional antenna to said amplifier, and to said loop antenna, a variable condenser, said last mentioned connection being made through said variable condenser, and means for disconnecting said non-directional antenna.

2. In radio direction finding apparatus, a plurality of loop antennae and a plurality of radio receivers, each of said loops and said receivers being adapted to receive signals of a different limited frequency range, means for combining said loops and said receivers comprising a tuning unit, said tuning unit comprising a plurality of independently operable tuning elements each adapted to a selected frequency range, and switch means for selecting the tuning element having the frequency range to which the said loop antennae is adjusted; and means for tuning the tuning element and loop within said frequency range for receiving a signal within said selected frequency range means for amplifying said signal and selective means for impressing said signal upon one of said receivers, a non-directional antenna, and means for selectively coupling said non-directional antenna to said amplifier, and to said loop antenna, a variable condenser, said last mentioned connection being made through said variable condenser, and means including said first mentioned switching means for directly coupling said loop to one of said receivers.

3. In radio direction finding apparatus, a plurality of loop antennae and a plurality of radio receivers, each of said loops and said receivers being adapted to receive signals of a different limited frequency range, means for combining said loops and said receivers comprising a tuning unit, said tuning unit comprising a plurality of independently operable tuning elements each adapted to a selected frequency range, and switch means for selecting the tuning element having the frequency range to which the said loop antennae is adjusted; and means for tuning the tuning element and loop within said frequency range for receiving a signal within said selected frequency range, means for amplifying said signal and selective means for impressing said signal upon one of said receivers, a non-directional antenna, and means for selectively coupling said non-directional antenna to said amplifier, and to said loop antenna, a variable condenser, said last mentioned connection being made through said variable condenser, and means including said first mentioned switching means for directly coupling said loop to one of said receivers.

4. In radio direction finding apparatus, a tuning unit for interconnecting one of a plurality of directional antennae, a non-directional antenna and one of a plurality of radio receivers, said tuning unit comprising a plurality of preset tuned circuits, each adapted to a particular frequency range switching means for selectively interconnecting one of said loops and one of said tuned circuits for receiving a signal, an amplifier, said amplifier being controlled by said signal, a second amplifier energized by said first amplifier, the output of said second amplifier being selectively coupled to one of said receivers, switching means for selectively connecting said non-directional antenna to a non-directional antenna amplifier, the output of said last mentioned amplifier being connected to the input circuit of said second amplifier, said last mentioned switching means providing means for coupling said non-directional antenna to said first amplifier and said preset tuned circuits, a balance condenser, said coupling being through said balance condenser, and means for disconnecting said non-directional antenna from said tuning unit.

5. In radio direction finding apparatus, a tuning unit for interconnecting one of a plurality of directional antennae, a non-directional antenna and one of a plurality of radio receivers, said tuning unit comprising a plurality of preset tuned circuits each adapted to a particular frequency range, switching means for selectively interconnecting one of said loops and one of said tuned circuits for receiving a signal, an amplifier, said amplifier being controlled by said signal, a second amplifier energized by said first amplifier, the output of said second amplifier being selectively coupled to one of said receivers, switching means for selectively connecting said non-directional antenna to a non-directional antenna amplifier, the output of said last-mentioned amplifier being connected to the input circuit of said second amplifier, said last-mentioned switching means providing means for coupling said non-directional antenna to said first amplifier and to said present tuned circuits, a balance condenser, said coupling being through said balance condenser, and means for disconnecting said non-directional antenna from said tuning unit, and means including said first mentioned switching means for directly joining said loop to one of said receivers.

WILLIAM G. H. FINCH.

REFERENCES CITED

The following references are of record in the file of this patent:

UNITED STATES PATENTS

| Number | Name | Date |
|---|---|---|
| 2,110,852 | Blodgett | Mar. 15, 1938 |
| 2,144,309 | Hicks | Jan. 17, 1939 |
| 2,289,147 | Shea | July 7, 1942 |
| 2,349,154 | Finch et al. | May 16, 1944 |